June 7, 1927.
H. C. MACAULAY
1,631,876
STEAM TRAP
Filed March 21, 1924
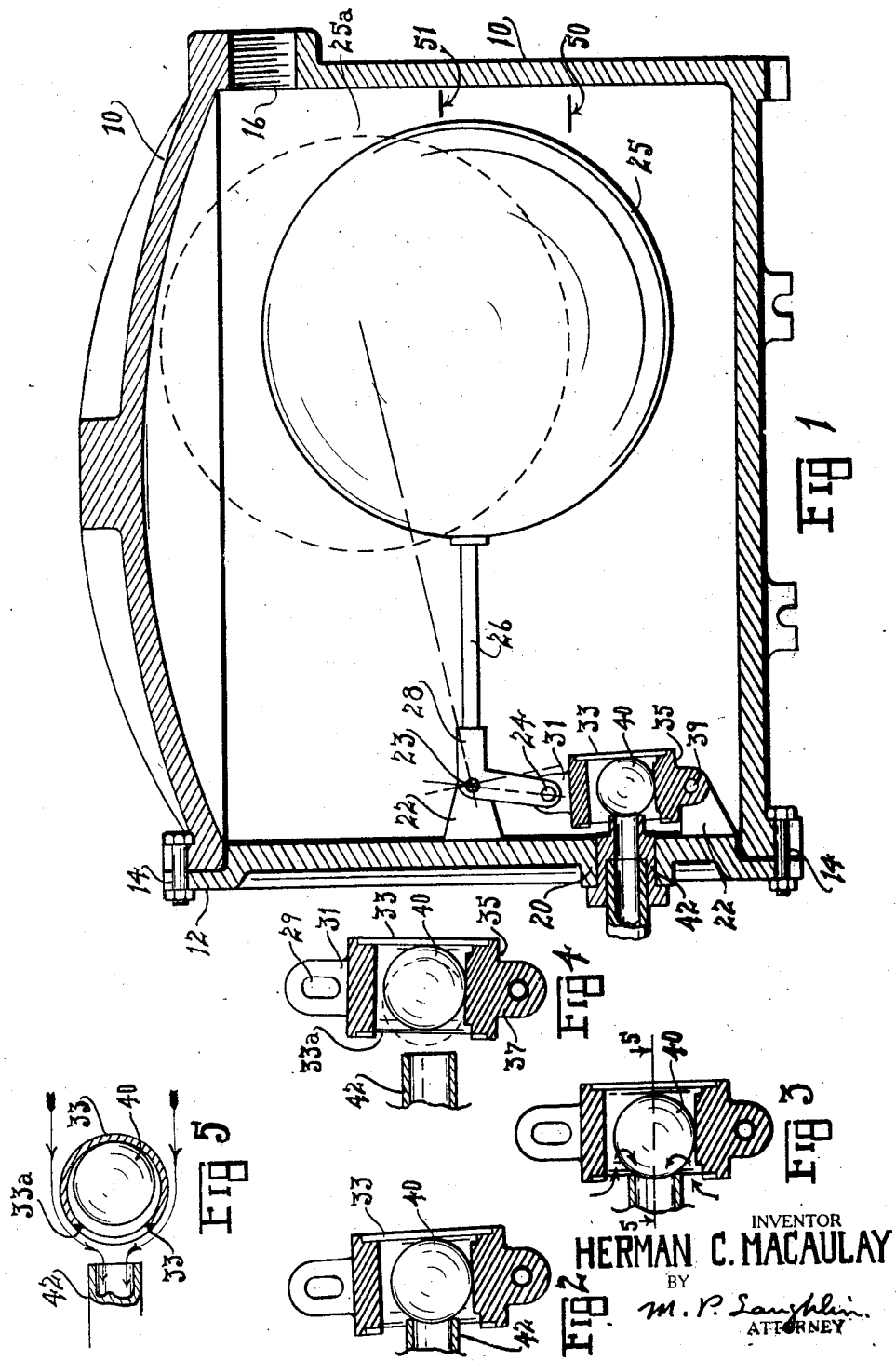
INVENTOR
HERMAN C. MACAULAY
BY
M. P. Laughlin
ATTORNEY Patented June 7, 1927.

1,631,876

UNITED STATES PATENT OFFICE.

HERMAN C. MACAULAY, OF RUMFORD, MAINE.

STEAM TRAP.

Application filed March 21, 1924. Serial No. 700,750.

This invention relates to improvements in steam traps and valve means therefor.

The general object of this invention is to provide a steam trap of simple structure, rugged construction, and low cost, which will not be liable to leakage and failure under severe operating conditions.

The especial purpose of my invention is the provision of a trap valve structure of such nature as to prevent wiredrawing and to obtain abrupt, complete valve opening and equally sharp "cutoff" or closure of the trap discharge port.

A further purpose of my invention is to provide a steam trap which will successfully operate, unaffected by pressure variations, and whose valve will open and close in a positive manner, without the necessity of special trap feeding, or periodic inlet means, commonly employed in attempting to obtain such opening and closing.

Heretofore it has been difficult to construct a trap capable of satisfactory operation. The conditions under which such devices must work are extremely severe; liquid usually comes to them in small quantities distributed over a space of time, but may enter in a solid stream. Their capacity must be such as to accommodate the maximum or minimum flow, either intermittently or continuously. At one moment the trap is receiving cold water, at the next high presure steam may be entering, yet the trap must operate equally well at high or low temperature, or pressure, if the drained device is to be adequately freed of liquid. As is well known to those skilled in the art, it has proven almost impossible to provide a valve for such traps which will open wide and close completely tight. The valve is actuated by a float, or other device responsive to the liquid in the trap body. Where the liquid conditions changed slowly, the valve opening also changed slowly, the valve often remaining only slightly opened for long periods. Small valve opening produced extremely high liquid velocity, (commonly called wiredrawing), resulting in a valve seat and disc so scored and cut that tight closing became impossible. With leaky valves the usefulness of the trap disappears, for when no liquid is entering the trap, steam is discharged and the whole device is purposeless.

The herein disclosed trap mechanism provides a minimum number of parts and has proven in practice to eliminate the foregoing difficulties.

Fig. 1 is a cross-sectional elevation of a preferred embodiment of my invention.

Fig. 2 shows a detail of the valve mechanism in closed position, with the valve cage shown in cross-section upon a vertical plane to disclose the valve ball position.

Figs. 3 and 4, are supplemental to Fig. 2, and serve to illustrate other valve positions.

Fig. 5 is also supplemental to Fig. 2, but taken upon the line 5—5 of Fig. 3.

Steam traps are commonly required to operate under pressure other than atmospheric, a suitable pressure tight shell or chamber 10, having a removable cover 12, retained by suitable bolts 14, is therefore preferably employed. It will, of course, be understood that such chambers may assume such form and structural detail as may be necessary to withstand existing pressure conditions, and merely serve to house the hereinafter described mechanism and to receive the liquid entering through a suitable inlet 16. Cover 12 is provided with a suitable outlet 20 and with internal projections 22 serving as bearings for the valve mechanism.

The valve mechanism comprises a float 25 mounted upon a float rod 26. Rod 26 engages the toggle bell crank 28 pivoted upon a pin 23 engaging the upper bearing projection 22. Crank 28, through pin 24, engages a slot 29 in the cap 31 of the valve box body 33. The lower end of body 33 is closed by a bottom cap 35 pivoted through cap ear 37, and pin 39, upon the lower shell bearing projection 22. Vertical motion of float 25 is transformed, through the mechanism described, into oscillation of box body 33, respective to the perpendicular.

Valve box body 33 serves to support and control a valve ball 40 which effects the closure of discharge port member 42.

The operation of ball valve 40, and the valve box, is best understood from Figs. 2 to 5 inclusive. In Figure 1, the float 25 is shown in the position for low liquid level (50), when no discharge is required. The corresponding valve position is shown to enlarged detail in Fig. 2; it will be noted that the back of box body 33 is pressing the valve ball 40 tightly to the discharge port 42 and that the weight of float 25 is multiplied by the toggle crank 28 and other mechanism described. Manifestly, the valve will be firmly held closed irrespective of pressure conditions in shell 10.

As more liquid enters shell 10, the float 25 rises until the liquid reaches such a level as that indicated at 51. The upper float position is approximately indicated by the dotted line 25ª. Box body 33 has now been oscillated beyond the vertical, to the position shown in Fig. 4. The edges 33ª engaging the ball valve 40 pull it away from the discharge port 42. Gravity immediately causes the ball to roll to the rear of the body 33. The position is indicated by the solid lines. The valve is now entirely clear of the discharge port and completely protected from the discharge stream by the box body 33, as is most clearly seen from Figure 5, taken in horizontal cross-section as indicated by the line 5—5 of Fig. 3. It will be noted that the closed body 33 shields the valve 40 from velocity pressure tending to close it and since there is not flow over, or around the valve ball, cutting or grooving is prevented. Discharge flow lines are indicated by the arrows of Fig. 5.

Discharge continues until the float 25 again floats upon level 50. In lowering, float 25 tilts box body 33 back beyond vertical into its first position. As the perpendicular is passed, gravity rolls the ball 40 toward the discharge port 42 and the pressure of the escaping fluid, acting as indicated in Fig. 3, snaps the valve shut, obtaining a quick sharp "cutoff". It should be understood that pressure closure occurs only a second before the back of box 33 contacts with the ball 40, and it has been found that when the parts come to rest the box 33 will be found to press the valve ball securely to its seat. The leverage provided by toggle mechanism multiplies the force due to the weight of float 25 and the force applied to ball 40 is ample to hold it securely against vibration or displacement.

The ball valve 40 remains undisturbed until the level 51 is again reached. Discharge occurs as often as required to care for the volume of liquid entering inlet 16.

The hereinbefore disclosed device will be seen to be simple in construction and operation while adapted to accomplish all of the objects and improvements previously enumerated.

Manifestly many modifications may be made in the arrangement of parts and in the specific construction of the elements shown without departure from the spirit of my invention or the scope of the appended claims.

What I claim is:

1. In a steam trap valve structure, a ball valve and the means for completely shielding said ball from fluid currents when in open position which comprises a single opening valve box.

2. In a steam trap valve structure, a pressure seated, gravity-actuated discharge valve ball, a box shield for said ball, a float external to said box shield, and toggle means translating float motion into box position whereby the limit of ball movement is defined by the aforesaid float.

3. A steam trap comprising a ported shell, a float within said shell, a valve box oscillated by said float, and a valve ball carried within said box, said float oscillating said box to press the valve ball to the port in said shell and completely shielding the ball up to the instant of seating.

4. A steam trap comprising a shell, a float, a valve actuating toggle, a valve box, and a valve ball, said shell provided with suitable inlet and outlet ports and with bearings for said mechanism, said float responsive to fluid conditions within said shell and controlling said mechanism, said valve actuating toggle responsive to the aforesaid float control and controlling the position of said box, said box limiting and directing the motion of said valve ball, said ball responsive to the movements of said box and controlling the aforesaid shell outlet.

Signed at Rumford in the county of Oxford and State of Maine this 12th day of March, A. D. 1924.

HERMAN C. MACAULAY.